United States Patent

Yamamoto

[19]

[11] Patent Number: 5,881,331
[45] Date of Patent: Mar. 9, 1999

[54] DEVICE FOR CONTROLLING OPERATION OF ELECTRO-DEVELOPING TYPE CAMERA

[75] Inventor: Yasuhiro Yamamoto, Tokyo, Japan

[73] Assignee: Asahi Kogaku Kogyo Kabushiki Kaisha, Tokyo, Japan

[21] Appl. No.: 749,017

[22] Filed: Nov. 14, 1996

[30] Foreign Application Priority Data

Nov. 15, 1995 [JP] Japan ................................. 7-321114

[51] Int. Cl.⁶ .................................................. G02B 17/48
[52] U.S. Cl. ............................................................ 396/429
[58] Field of Search ........................ 396/30, 429; 348/64, 348/209, 220, 231, 233, 328; 358/909.1

[56] References Cited

U.S. PATENT DOCUMENTS

| | | | |
|---|---|---|---|
| 4,837,628 | 6/1989 | Sasaki | 358/209 |
| 4,956,713 | 9/1990 | Takanshi et al. | 358/209 |
| 5,111,299 | 5/1992 | Aoki et al. | |
| 5,317,404 | 5/1994 | Fukushima et al. | 358/335 |
| 5,424,156 | 6/1995 | Aoki et al. | |
| 5,424,772 | 6/1995 | Aoki et al. | |
| 5,465,133 | 11/1995 | Aoki et al. | |
| 5,516,607 | 5/1996 | Iijima et al. | 430/20 |
| 5,631,701 | 5/1997 | Miyake | 348/222 |
| 5,648,816 | 7/1997 | Wakui | 348/233 |

FOREIGN PATENT DOCUMENTS 5-2280   1/1993   Japan .

Primary Examiner—Safet Metjahic
Assistant Examiner—John Chizmar
Attorney, Agent, or Firm—Greenblum & Berstein, P.L.C.

[57] ABSTRACT

An operation control device is provided in an electro-developing type camera using a recording medium which electronically develops an image formed by a photographing optical system. During a reading operation, in which the image recorded in the electro-developing recording medium is being read, if a recording operation is set by operation of a main switch, an enforced recording operation is started. During the enforced recording operation, pixel signals of one horizontal scanning line of the image are read through a line sensor. Then, a shutter is closed, a light source is turned OFF, and a scanning mechanism is withdrawn to a position at which the scanning mechanism does not interfere with the optical path of the photographing optical system. If a recording medium installed in the camera has not been recorded upon, a recording operation is started and an image is recorded in the new recording medium.

15 Claims, 11 Drawing Sheets

5,881,331

1

DEVICE FOR CONTROLLING OPERATION OF ELECTRO-DEVELOPING TYPE CAMERA

BACKGROUND OF THE INVENTION

1. Field of the Invention

The present invention relates to a camera using a recording medium in which an object image obtained through a photographing optical system is electronically developed, and more particularly, to a device controlling a recording operation in which the image is recorded in the recording medium.

2. Description of the Related Art

Conventionally, as disclosed in Japanese Unexamined Patent Publication No. 5-2280 and U.S. Pat. No. 5,424,156, there is a known photographic material which is directly electronically developed so that the developed visible image can be immediately obtained. In this specification, such a recording medium is referred to as an electro-developing recording material, and an electronic still camera using the electro-developing recording material is referred to as an electro-developing type camera.

In the electro-developing type camera, a reading operation, in which an image recorded in the electro-developing recording medium is read therefrom, takes a relatively long time, for example, several tens of seconds. Therefore, if the photographer tries to take a next photograph during the reading operation of the previous photograph taken, the next photograph cannot be taken until the reading operation is completed. As a result, a photo opportunity may be missed.

SUMMARY OF THE INVENTION

Therefore, an object of the present invention is to provide an operation control device by which a desired image can be always photographed without missing a photo opprtunity, even though a reading operation is being carried out in the electro-developing type camera.

According to the present invention, there is provided a device for controlling an operation of an electro-developing type camera using a electro-developing recording medium by which an image is electronically developed. The control device includes an image recording processor, an image reading processor, and an operation mode setting processor.

The image recording processor records an image in the electro-developing recording medium in accordance with a photographing operation of the electro-developing type camera. The image reading processor reads the image recorded in the electro-developing recording medium. The operation mode setting processor actuates the image recording processor and the image reading processor, and can stop the reading operation of the image reading processor and actuate the image recording processor while the image reading processor is being operated.

Further, according to the present invention, there is provided a device for controlling an operation of an electro-developing type camera using a electro-developing recording medium by which an image is electronically developed. The control device includes an image recording processor carrying out a recording operation in which an image is recorded in the electro-developing recording medium in accordance with a photographing operation of the electro-developing type camera, and an image reading processor carrying out a reading operation in which the image is read. The image recording processor can carry out the recording

2 operation even when the reading operation of a one frame image has not been completed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
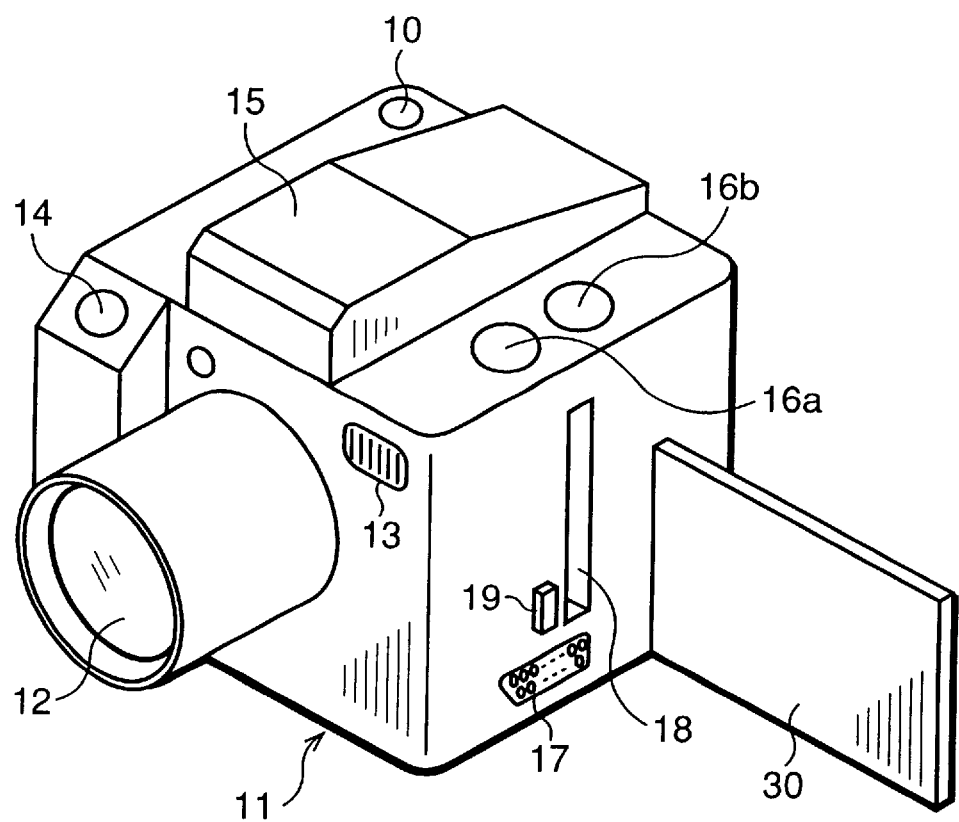
FIG. 1 is an external view showing an electro-developing type camera to which an embodiment according to the present invention is applied.

FIG. 1 is an external view of an electro-developing type camera to which an embodiment according to the present invention is applied.

When viewing a camera body 11 from a front side, a photographing optical system 12 including a photographing lens system provided approximately at a center portion of the front surface of the camera body 11. An electronic flash 13 is disposed thereon to the right of and above the photographing optical system 12. A release switch 14 is provided on the side opposite to the electronic flash 13.

On the upper surface of the camera body 11, a view finder 15 is provided at a center portion thereof and extends from the front end to the rear end of the camera body 11. A main switch 10, by which an electric power can be turned ON and an operation mode of the camera can be set, is provided on the upper surface to the right of the view finder 15. First and second scanning switches 16a and 16b are provided on the side opposite to the main switch 10. The first scanning switch 16a is provided for reading a one frame image recorded in an electro-developing recording medium 30. The second scanning switch 16b is provided for reading an image recorded in the electro-developing recording medium 30 from a midway point of one frame of the image.

An output terminal 17 is formed on a lower portion of a side surface of the camera body 11, so that an image signal obtained by this camera can be output to an external recording device. Further, a slot 18, into which the electro-developing recording medium 30 is mounted in the camera body 11, is formed on the side surface of the camera body 11. An eject switch 19, which is pressed to remove the electro-developing recording medium 30 from the camera body 11, is provided close to the slot 18.

Figure 2:
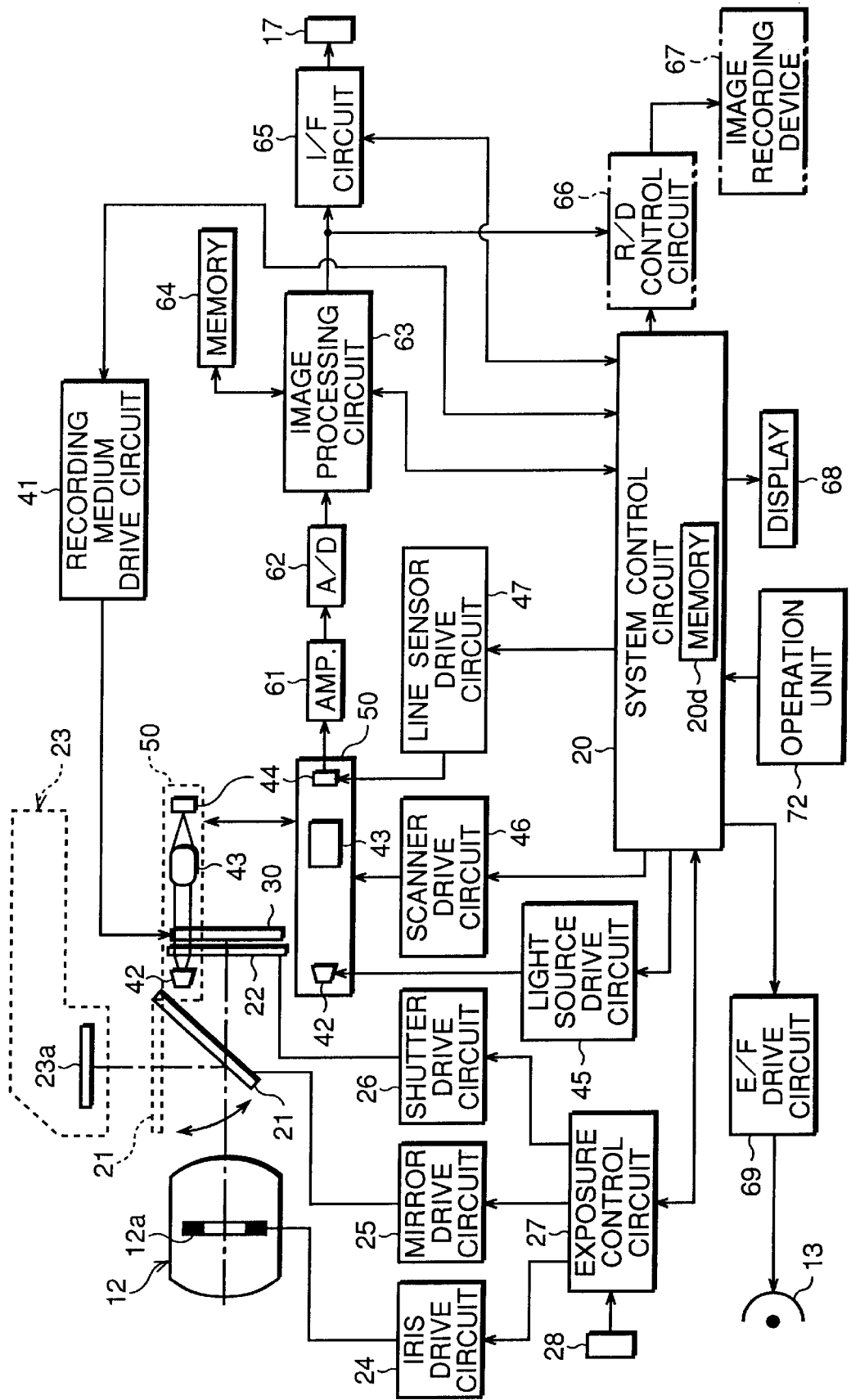
FIG. 2 is a block diagram of the electro-developing type camera.

FIG. 2 is a block diagram of the electro-developing type camera, in which a system control circuit 20, including a microcomputer and a memory 20d, is mounted to control the electro-developing type camera as a whole.

The photographing optical system 12 has a plurality of lens groups and an aperture 12a. An electro-developing recording medium 30 is disposed behind the photographing optical system 12. A quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal output by the system control circuit 20. Namely, when an exposure is controlled, the size of the opening of the aperture 12a is adjusted by the iris drive circuit 24 under the control of the exposure control circuit 27 based on a signal output by a photometry sensor 28.

The quick return mirror 21 is usually set to a down position (an inclining position shown by the solid line in the drawing), so that a light beam passing through the photographing optical system 12 is led to the view-finder optical system 23, such that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is normally closed when inactive. During a photographing operation, the shutter 22 is opened for a predetermined period by the shutter drive circuit 26 under the control of the exposure control circuit 27. Light passing through the photographing optical system 12 enters a light receiving surface of the electro-developing recording medium 30 to form a two-dimensional image thereon. The shutter 22 is also opened when a scanning operation of the scanning mechanism 50 is performed.

An electric voltage (recording medium activating signal) is applied to the electro-developing recording medium 30 under the control of a recording medium drive circuit 41. By exposing the electro-developing recording medium 30 while applying this voltage, an image formed by the photographing optical system 12 is developed on the electro-developing recording medium 30 as a visible image. The recording medium drive circuit 41 is operated in accordance with a command signal outputted by the system control circuit 20.

A scanning mechanism 50 is provided close to the electro-developing recording medium 30. A light source 42 includes an LED (light emitting diode) and a collimator lens, and emits a parallel light beam. The light source 42, a scanner optical system 43 and a line sensor 44 are supported by the scanning mechanism 50, and are moved along the electro-developing recording material 30 by a scanning operation of the scanning mechanism 50.

The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. During scanning by the scanning mechanism 50, the scanner optical system 43 is positioned between the electro-developing recording medium 30 and the line sensor 44; the image developed by the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved in an imaging plane, on which an image is formed by the scanner optical system 43.

An ON and OFF control of the light source 42 is performed by a light source drive circuit 45. Control of the reading operation of the pixel signal generated in the line sensor 44 is carried out by a line sensor drive circuit 47. The control of the movement of the scanning mechanism 50 is performed by a scanner drive circuit 46. The circuits 45, 46 and 47 are controlled by the system control circuit 20.

Pixel signals read out from the line sensor 44 are amplified by an amplifier 61, and converted to a digital signal by an A/D converter 62. The digital pixel signals are subjected to shading correction, gamma correction etc. by an image processing circuit 63 under the control of the system control circuit 20, and then temporarily stored in a memory 64. The memory 64 includes an EEPROM in which correction data for the shading correction is stored. The memory 64 may have a storage capacity equal to one horizontal scanning line outputted from the line sensor 44, or may have a storage capacity of pixel signals of one frame.

The pixel signals read from the memory 64 are input to an interface circuit 65 through the image processing circuit 63, so that the pixel signals are subjected to a predetermined process such as a format conversion, and can be output to an external display device (not shown) through the output terminal 17. The pixel signals outputted from the image process circuit 63 are subject to a predetermined process, such as an image compression and a format conversion in a recording device control circuit 66, so that the pixel signals can be recorded on a recording medium such as an IC memory, card (for example, in an image recording device 67). The interface circuit 65 and the recording device control circuit 66 are operated in accordance with a command signal output from the system control circuit 20.

An operation unit 72 having the main switch 10, the release switch 14, and the first and second scanning switches 16a and 16b is connected to the system control circuit 20. A photographing operation (i.e. a recording operation) and a reading operation of image signals are performed by operating the operation unit 72. A display device 68 for indicating various setting conditions of the electro-developing type camera, and an electronic flash drive circuit 69 for performing a flash control of the electronic flash 13 are also connected to the system control circuit 20.

Figure 3:
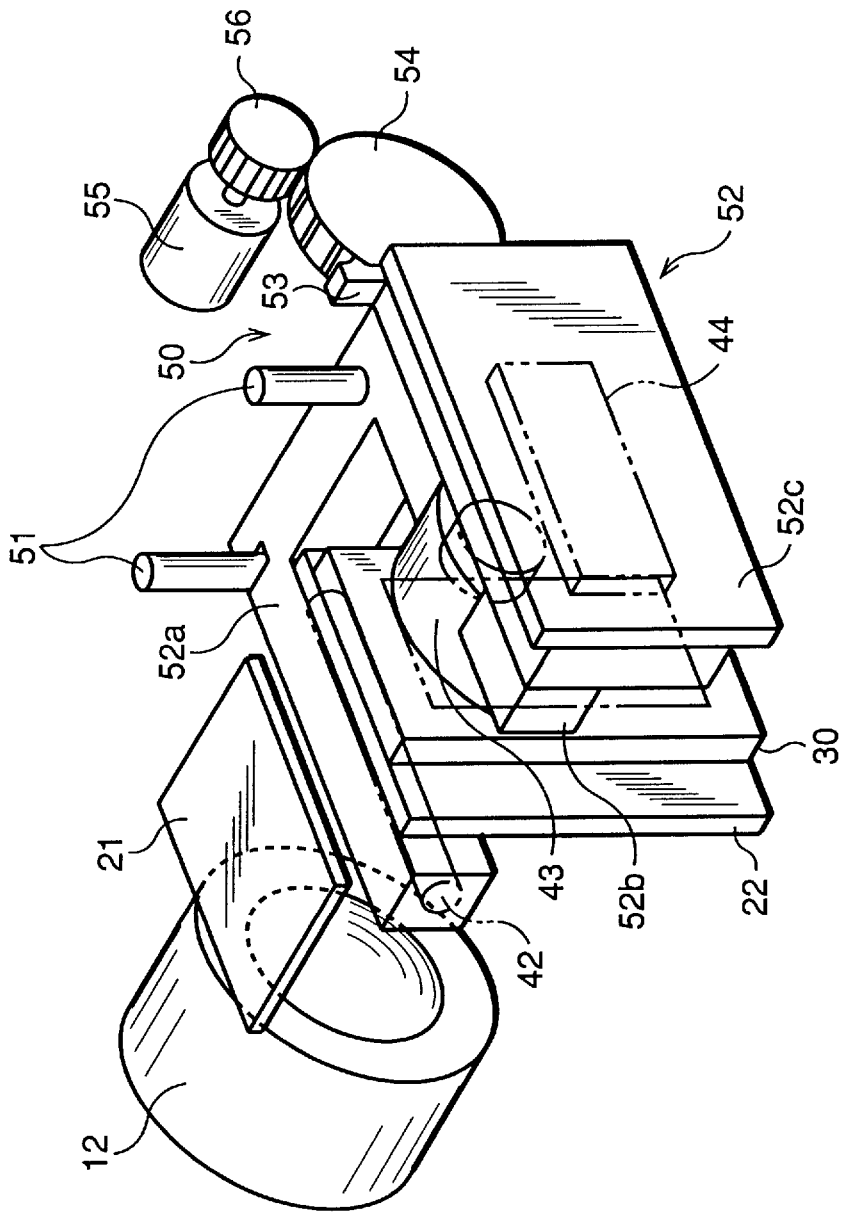
FIG. 3 is a perspective view showing a scanning mechanism and members provided around the mechanism.

FIG. 3 shows the structure of the scanning mechanism 50, and members provided around the mechanism 50.

The scanning mechanism 50 has a moving member 52 which is slidably supported by a pair of guide shafts 51 and has first and second leg portions 52a and 52b and a support portion 52c. The first leg portion 52a extends between the quick return mirror 21 and the shutter 22, and the second leg portion 52b extends behind the electro-developing recording medium 30. The support portion 52c is provided behind the second leg portion 52b. The light source 42, the scanner optical system 43, and the line sensor 44 are attached to the first leg portion 52a, the second leg portion 52b, and the support portion 52c, respectively. The light source 42 and the line sensor 44 are extended in a horizontal direction, respectively. A rack 53 fixed to the moving member 52 is meshed with a pinion 54, which in turn is meshed with a gear 56 provided on an output shaft of a scan drive motor 55.

Before a reading of an image from the electro-developing recording medium 30 is performed, the moving member 52 is in a position offset from a path between the photographing optical system 12 and the electro-developing recording medium 30; this position is, For example below the electro-developing recording medium 30 When a photographing operation has been completed and an image has been developed in the electro-developing recording medium 30, the scan drive motor 55 is operated by operating the first or second scanning switch 16a or 16b; the moving member 52 is moved upward so that a scan of the line sensor 44 is carried out, and the line sensor 44 is moved in a direction perpendicular to the longitudinal direction of the line sensor 44.

Figure 4:
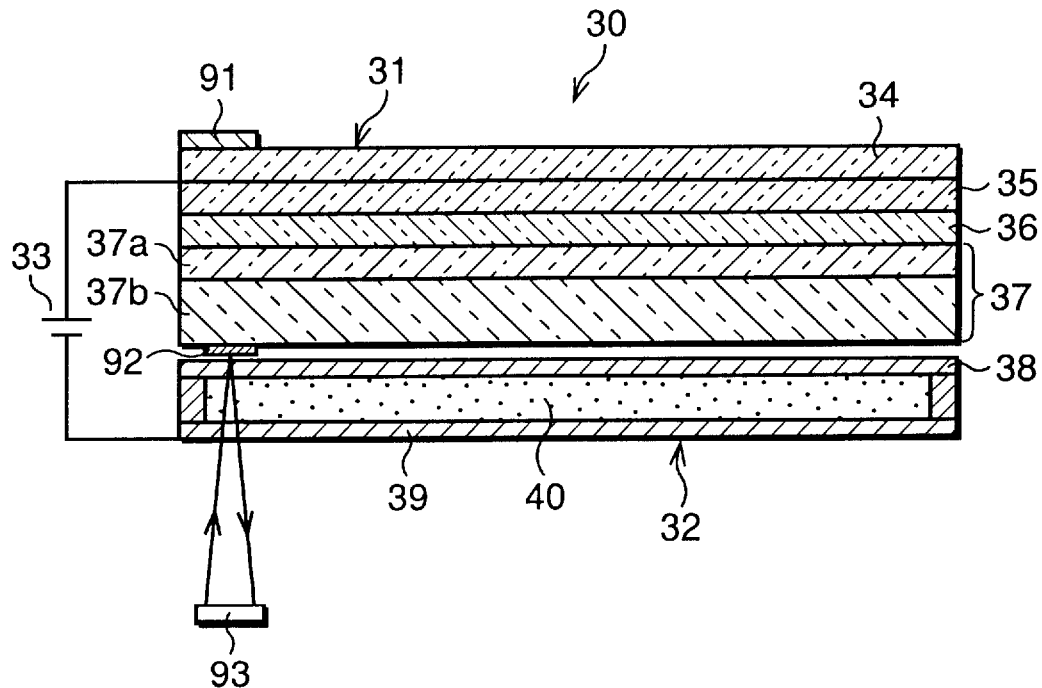
FIG. 4 is a sectional view showing a structure of an electro-developing recording medium.

FIG. 4 shows a structure of the electro-developing recording medium 30, which is obtained by modifying an electro-developing recording medium shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image. Thus, an image of an object is developed, i.e., the visible image is generated in accordance with the electric charge.

The electric charge storage medium 32 is a liquid crystal display having a memory-type liquid crystal. The developed visible image is kept therein even if the electric field is removed. In the liquid crystal display, the developed visible image can be erased by heating the liquid crystal display, using a heating device (not shown) at a predetermined temperature. In this case, the same electric charge storage medium 32 can be used repeatedly.

The electro-developing recording medium 30 is constructed so as to be able to determine whether the electro-developing recording medium 30 has been recorded or has not been recorded. While an electric voltage is applied to the electro-developing recording medium 30, the transparency thereof is changed even in a portion which is shielded from light and is not exposed, and this transparency is kept even after the electric voltage is released. Therefore, by taking advantage of the characteristics in which the transparency is changed in accordance with the application of the electric voltage, it can be determined whether the electro-developing recording medium 30 has been recorded or has not been recorded.

Namely, a part of the light receiving surface of the electrostatic information recording medium 31, or a part of the surface of the base plate 34, is covered with a metal foil Fragmental (such as an aluminum foil fragment), so that a light shield portion is formed. The light shield portion is positioned outside of the image area of the liquid crystal display 40, in which an image is formed. Further, a reflecting element 92 is provided on a part of a surface opposite to the electrostatic information recording medium 31 of the electro-developing recording medium 30, or a part of the surface of the photoconducting layer 37, and is aligned with the light shield portion. The reflecting element 92 may be a metal foil fragment such as an aluminum foil fragment, or may be obtained by applying a paint having a reflectivity to the photoconducting layer 37.

A transparency sensor 93 is disposed at a position corresponding to the reflecting element 92, and under the electric charge storage medium 32. The transparency sensor 93 has a light emitting diode and a light receiving diode. A light emitted by the light emitting diode of the transparency sensor 93 enters the reflecting element 92 through the liquid crystal display 40, and is reflected by the reflecting element 92. The reflected light passes through the liquid crystal display 40, and is received by the light receiving diode of the transparency sensor 93. The light receiving diode then outputs a signal corresponding to the intensity of the reflected light.

Figure 5:
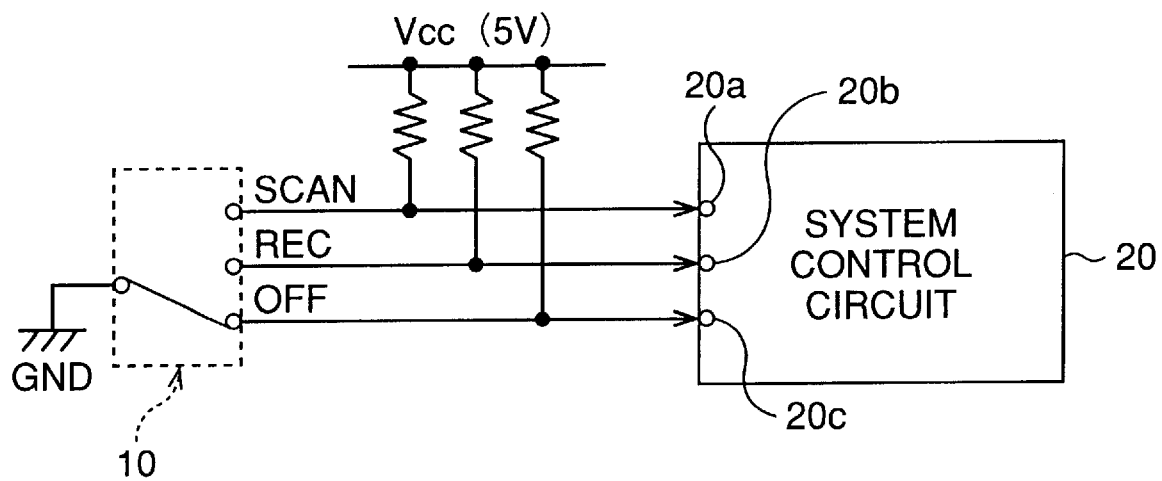
FIG. 5 is a diagram showing an electric circuit of a main switch.

FIG. 5 shows an electric circuit of the main switch 10, this circuit being provided in the operation unit 72 (see FIG. 1). The main switch 10 can be set at a scanning position (SCAN) at which an image formed in the electro-developing recording medium 30 is read, a recording position (REC) at which an image is recorded in the electro-developing recording medium 30, and a rest position (OFF) at which no operation is performed. The main switch 10 is connected to first, second, and third terminals 20a, 20b, and 20c provided in the system control circuit 20, and to a power supply Vcc.

When the main switch 10 is set at the scanning position, an electric voltage of the first terminal 20a is set to a low (L) level, and an electric voltage of each of the other terminals 20b and 20c becomes a high (H) level. Similarly, when the main switch 10 is set at the recording position or the rest postion, the electric voltage of the second or third terminal 20b or 20c is set to the L level, and the electric voltage of each of the other terminals becomes the H level. Thus, the connecting condition of the main switch 10 is sensed by detecting the electric voltage levels of these terminals 20a, 20b, and 20c.

For example, when the main switch 10 is changed from the scanning position, in which an image recorded in the electro-developing recording medium 30 is being read, to the recording position, the electric voltage of the first terminal 20a is changed from the L level to the H level, and the electric voltage of the second terminal 20b is changed from the H level to the L level. In the system control circuit 20, such a change of the electric voltage of each of the terminals 20a, 20b, and 20c is recognized as a signal by which an enforced recording operation, in which the reading operation is interrupted and the recording operation is started, is carried out.

Figure 6:
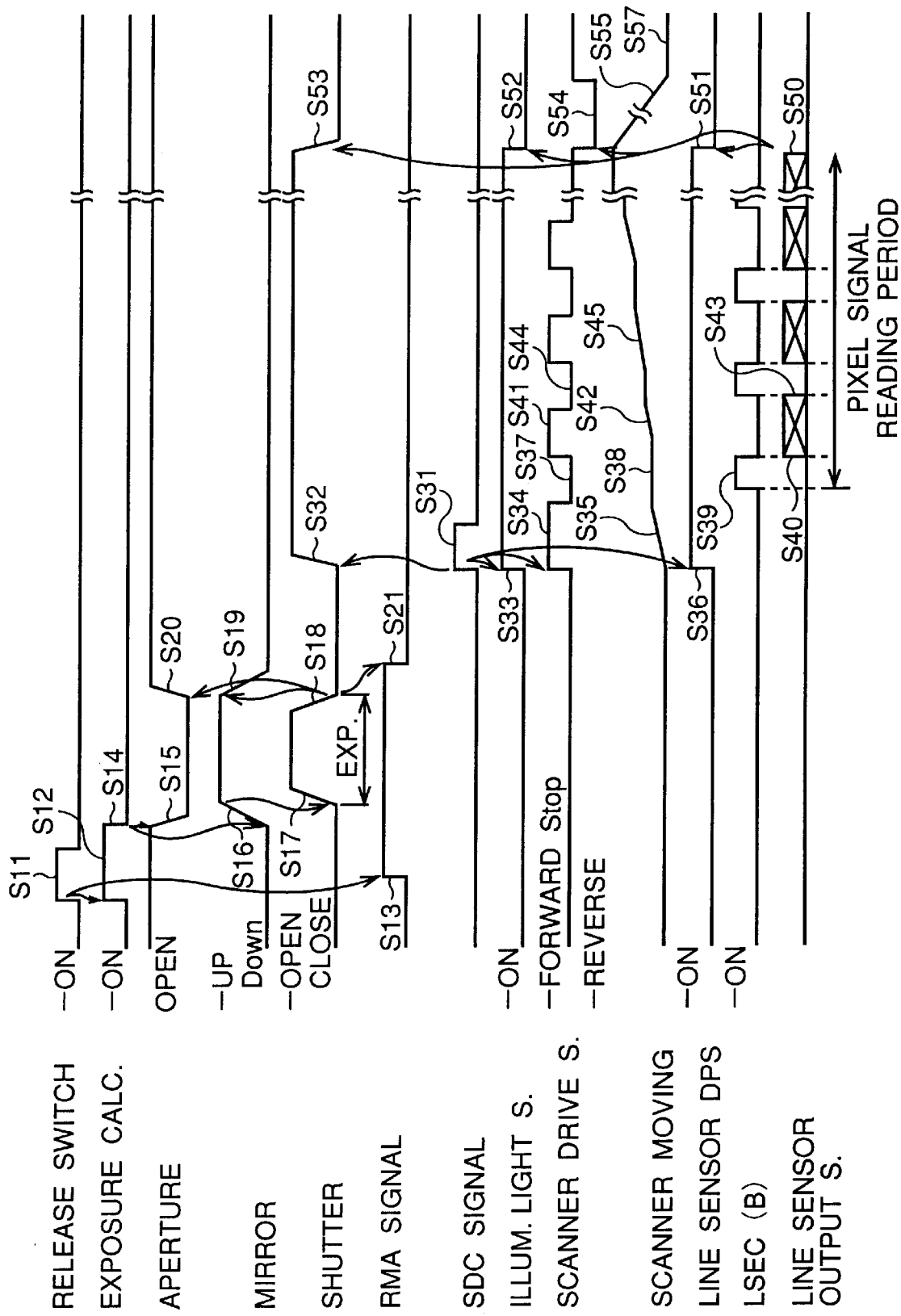
FIG. 6 is a timing chart showing a normal recording operation and a reading operation.
Figure 7:
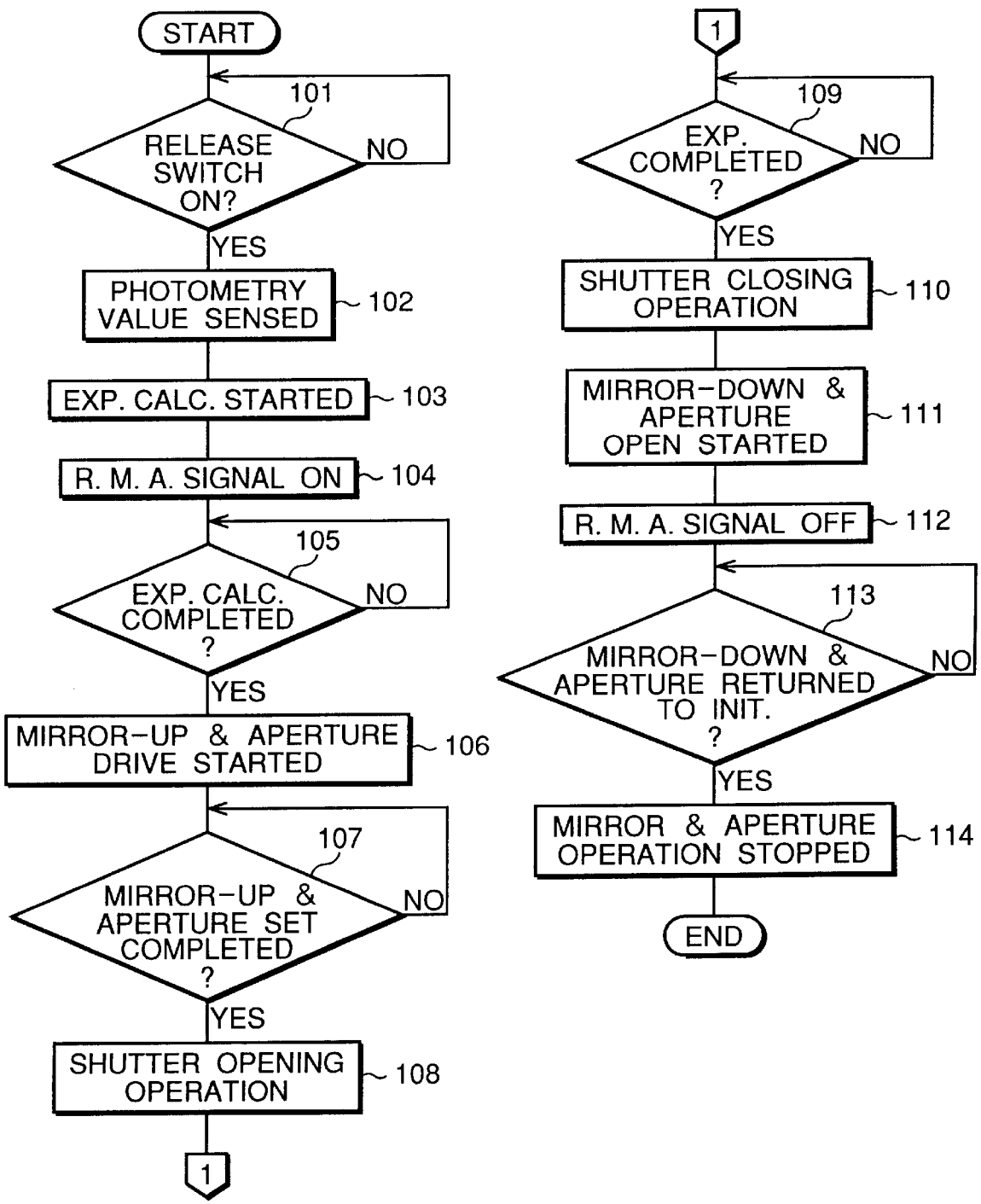
FIG. 7 is a flow chart of the normal recording operation.
Figure 8A:
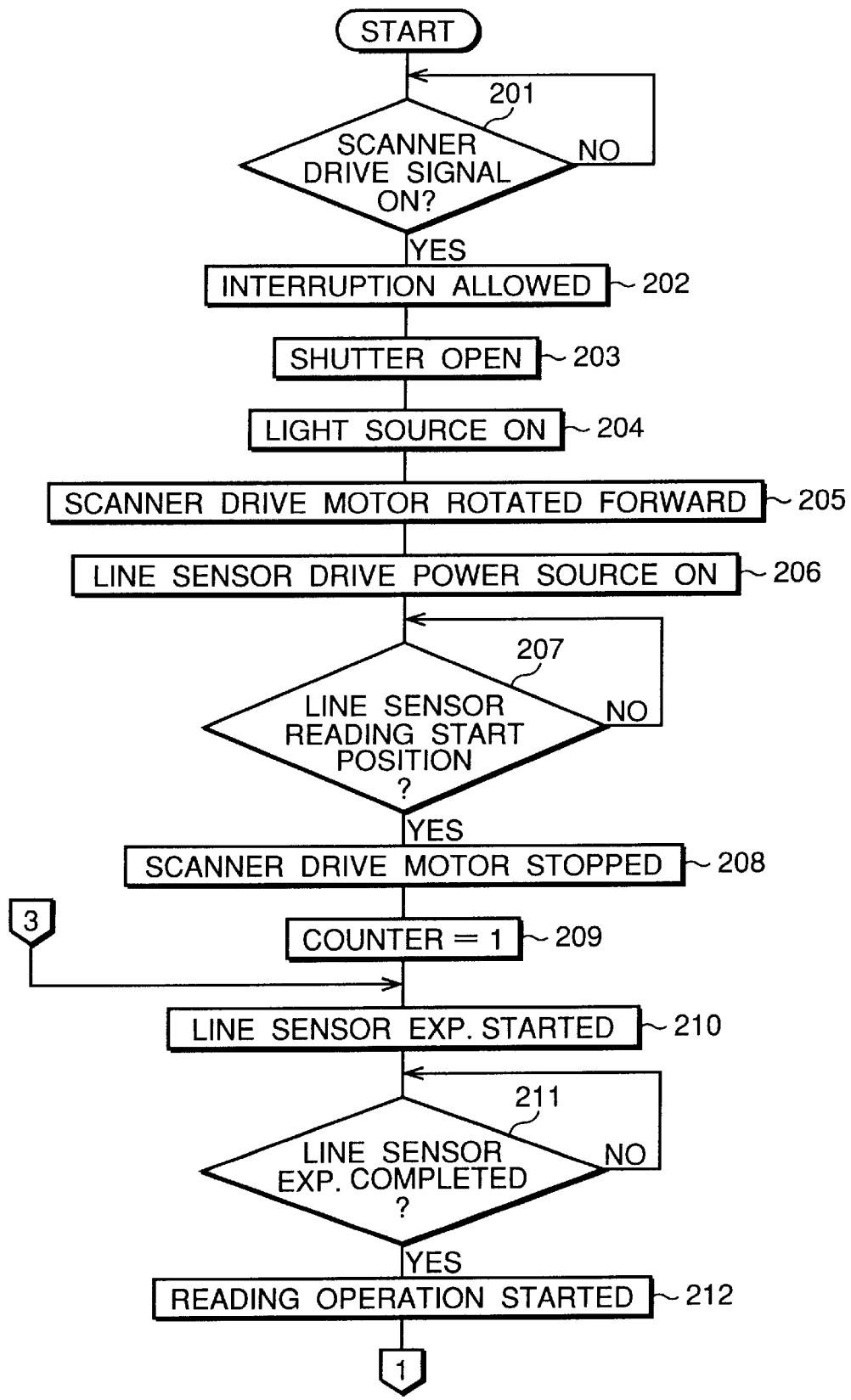
FIGS. 8A, 8B, and 8C are flow charts of a reading operation.
Figure 8B:
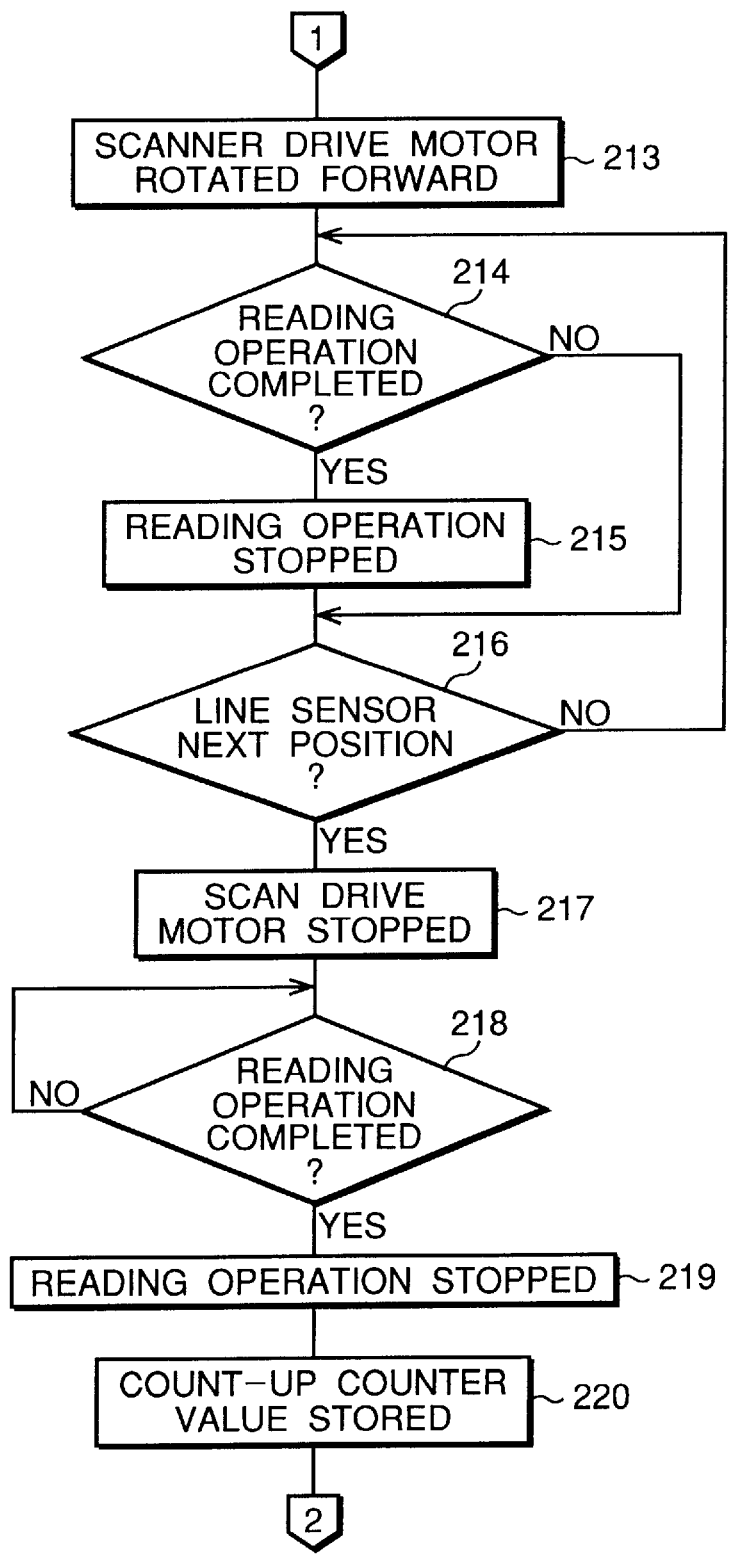
Figure 8C:
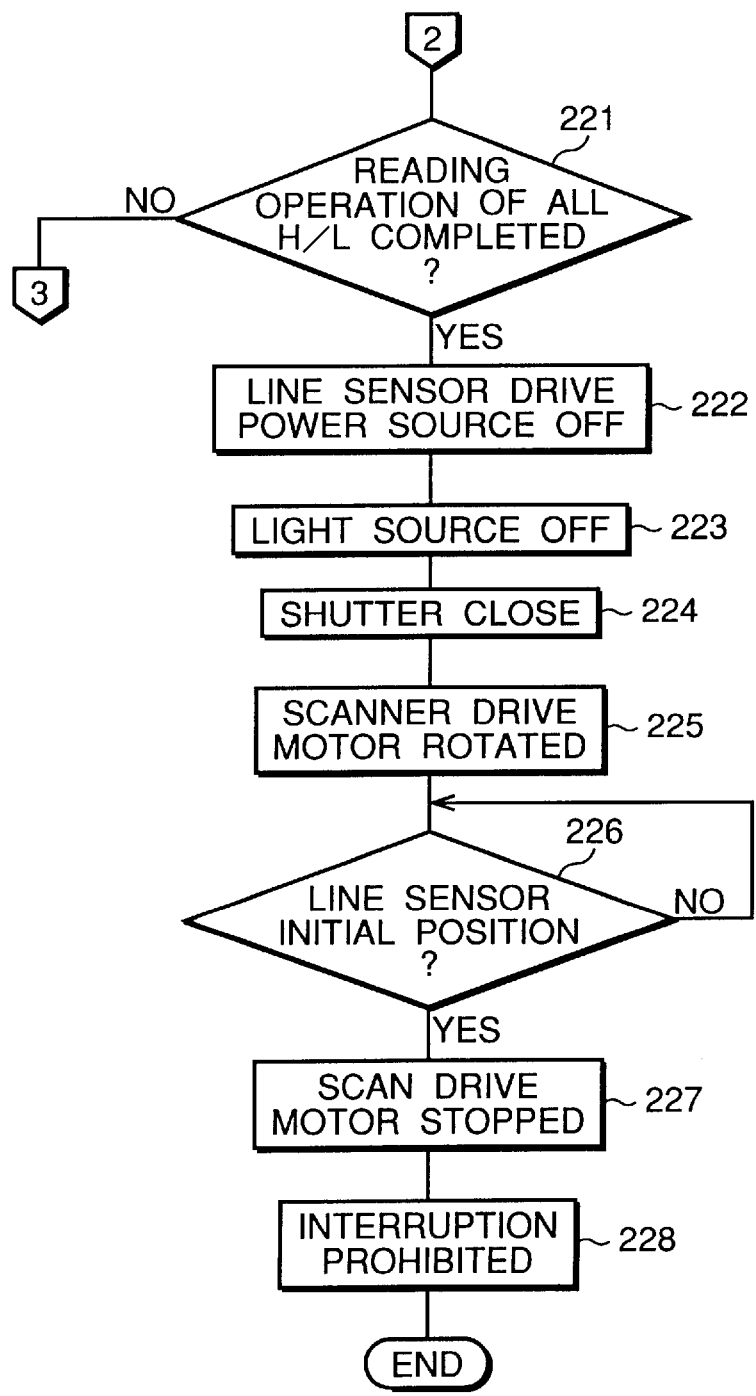

FIG. 6 is a timing chart showing a recording operation in which an image is recorded in the electro-developing recording medium 30, and a reading operation in which the image recorded in the electro-developing recording medium 30 is read by the line sensor 44. FIG. 7 is a flow chart of the normal recording operation, and FIGS. 8A, 8B, and 8C are flow charts of the reading operation. The normal recording operation and the reading operation will be described with reference to these drawings.

When it is sensed in Step 101 that the release switch 14 has been depressed (reference S11), an output signal of the photometry sensor 28, i.e., a photometry value, is sensed in Step 102. In Step 103, an exposure calculation is started based on the photometry value (reference S12). When a predetermined time has passed since the release switch 14 was depressed, a recording medium activating signal is output in Step 104 (reference S13). The power source 33 is turned ON to thereby apply an electric voltage to the electrostatic information recording medium 31 and an electric charge storage medium 32. When it is confirmed in Step 105 that the exposure calculation has been completed (reference S14), the recording operation is performed in Step 106, and the following Steps in accordance with the calculation result.

In Step 106, the size of the opening of the aperture 12a is changed from the fully open state to a predetermined size (reference S15), and the quick return mirror 21 is changed from the down condition to the up condition (reference S16). When it is confirmed in Step 107 that the quick return mirror 21 has been changed to the up condition and the aperture 12a is at the proper size, the shutter 22 is opened in Step 108 (reference S17). When the exposure time obtained based on the exposure calculation has passed and it is confirmed in Step 109 that the exposure has been completed, the shutter 22 is closed in Step 110 (reference S18). With the completion of the closing operation of the shutter 22, Step 111 is executed to rotate the mirror 21 to the down position (reference 19) and to return the aperture 12a to the fully open position (reference S20). In Step 112, the output of the recording medium activating signal is stopped (reference S21).

Thus, the recording medium activating signal is continuously output at least while the shutter 22 is open. Over this period, a predetermined voltage is applied to the electro-developing recording medium 30. By exposing the electro-developing recording medium 30 under this condition, the object image is developed on the electro-developing recording medium 30 as a visible image, which is held on the electro-developing recording medium 30 even after the output of the recording medium activating signal is stopped.

When it is confirmed in Step 113 that the mirror 21 and the aperture 12a have returned to their initial positions the operations of the mirror 21 and the aperture 12a are stopped in Step 114. Thus, the normal recording operation ends.

On the other hand, when the first scanning switch 16a is depressed, the scanning operation of the scanning mechanism 50 is started, so that the reading operation shown in FIGS. 8A, 8B, and 8C is executed.

Figure 9A:
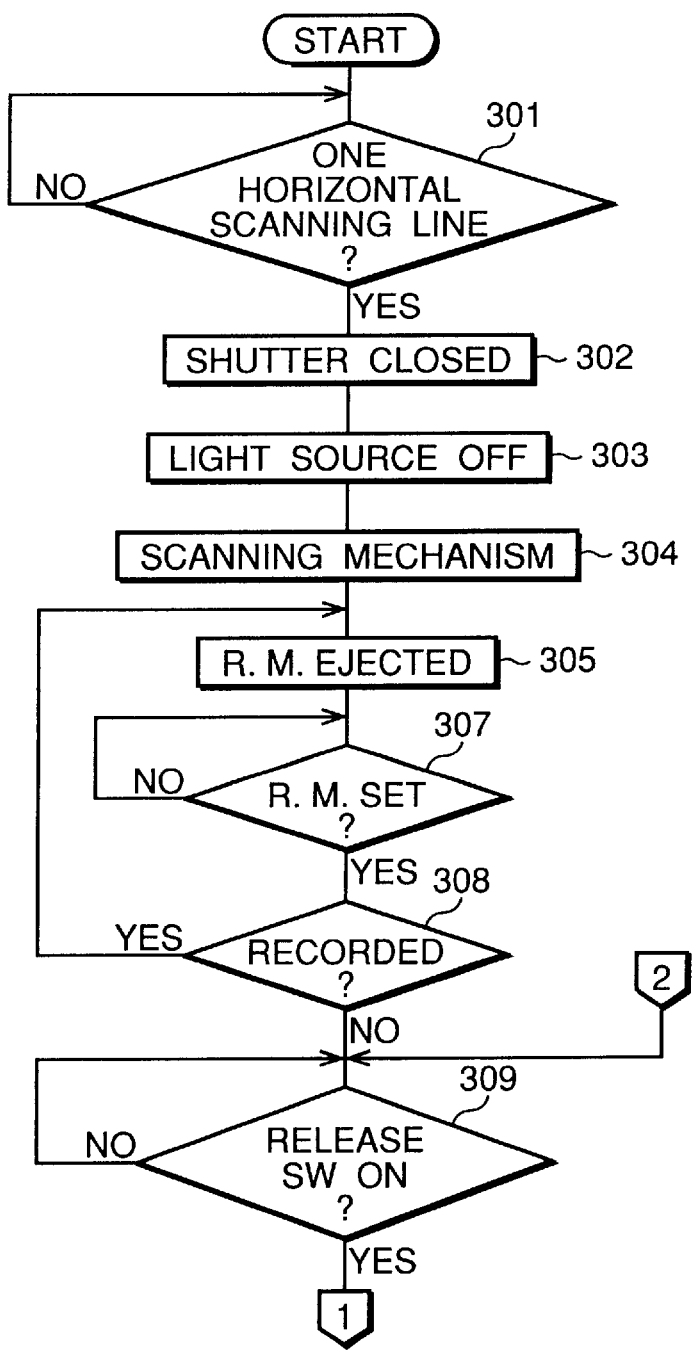
FIGS. 9A and 9B are flow charts of an enforced recording operation.
Figure 9B:
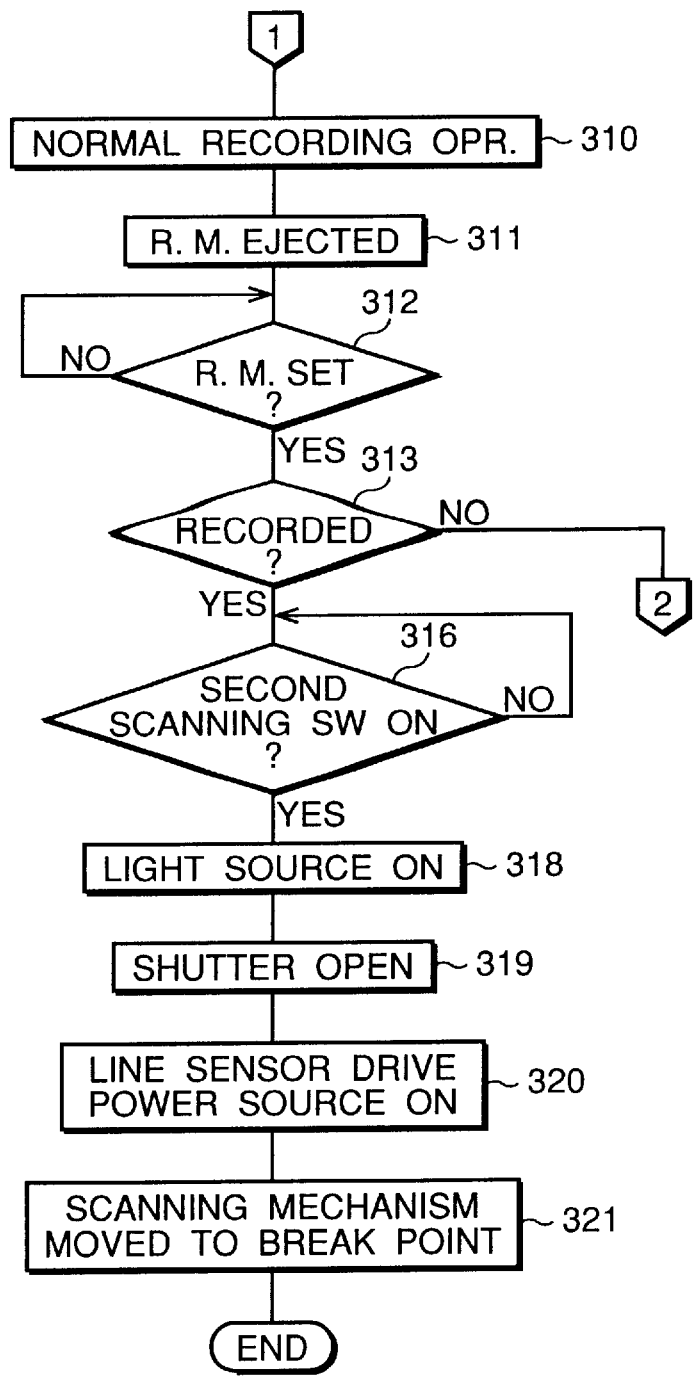

When it is confirmed in Step 201 that a scanner drive signal has been output (reference S31), the execution of the program of the enforced recording operation shown in FIGS. 9A and 9B is carried out on an interruption basis. In Step 203, the shutter 22 is opened (reference S32) In Step 204, the light source 42 is illuminated (reference S33). In Step 205, a scanner drive signal is output (reference S34), so that the scan drive motor 55 is rotated in a forward direction; this moving member 52 of the scanning mechanism 50 upward from the lowest position of the electro-developing recording medium 30 (reference S36), i.e., from the initial position of the scanning mechanism 50. In Step 206, a line sensor drive power source included in the line sensor drive circuit 47 is turned ON (reference S36).

When it is confirmed in Step 207 that the line sensor 44 is set at a reading position (i.e., the first horizontal scanning line of the image to be scanned), the output of the scanner drive signal is stopped in Step 208 (reference S37), and thus the scan drive motor 55 is stopped (reference S38). This stopping operation is controlled by counting pulse signals, for example, used for rotating the scan drive motor 55. In Step 209, a counter indicating the position of the horizontal scanning line of the image read by the line sensor 44 is set to 1 as the initial value.

In Step 210, exposure of the line sensor 44 begins to accumulate an electric charge in the line sensor 44 (reference S39). After in Step 211 that the exposure of the line sensor 44 has been completed (via elapsed time), in Step 212, a reading operation of the line sensor 44 begins in Step 212. Pixel signals of one horizontal scanning line are output from the line sensor 44 (reference S40). In Step 213, the scanner drive signal for operating the scan drive motor 55 in a forward direction is output (reference S41), to move moving member 52 upward (reference S42).

During movement of the moving member 52, when it is confirmed in Step 214 that the reading operation of the line sensor 44 has been completed, the reading operation is stopped in Step 215 (reference S43). The completion of the reading operation is controlled by counting pulse signals which are from the line sensor drive circuit 47 to drive the line sensor 44. If the completion of the reading scan is not confirmed in Step 214, Step 215 is skipped and Step 216 is executed, so that it is confirmed whether or not the line sensor 44 has been set at the position of the next horizontal scanning line, i.e., the next reading position. When the line sensor 44 has not been set at the position of the next horizontal scanning line, Steps 214 through 216 are re-executed.

When it is confirmed in Step 216 that the line sensor 44 has been set at the position of the next horizontal scanning line, the output of the scanner drive signal is stopped in Step 217 (reference S44), and thus the scan drive motor 55 is stopped (reference S45). This stopping operation is controlled by counting pulse signals used for rotating the scan drive motor 55. In Step 218, the completion of the reading operation of the line sensor 44 is confirmed (in the same way as for Step 214) and the reading operation is stopped in Step 219. Even when the loop of Steps 214 through 216 is ended without executing Step 215, the reading operation of the line sensor 44 is completed in Step 219.

In Step 220, the counter indicating the position of the horizontal scanning line of the image read by the line sensor 44 is incremented by The counter value which has been incremented is stored in a memory 20d provided in the system control circuit 20, as shown in FIG. 2.

In Step 221, it is determined whether the reading operation for all of the horizontal scanning lines has been completed by the value of the counter which has been counted in Step 220. The number of all of the horizontal scanning lines may be 2000, for example. If the reading operation of all of the horizontal scanning lines has not been completed, Steps 210 through 220 described above are repeated.

The line sensor 44 is thus repeatedly moved and then stopped, after a predetermined time and by a predetermined amount, by the scanning mechanism 50. The line sensor 44 moves on the imaging plane of the scanner optical system 43 to scan the image developed by the electro-developing recording medium 30, and the pixel signals are read out while the line sensor 44 is moving.

When all of the horizontal scanning lines have been read out (reference S50), the control passes from Step 221 to Step 222. In Step 222, the drive power source of the line sensor 44 is turned OFF (reference S51). In Step 223, the light source 42 is turned OFF (reference S52). In Step 224, the shutter 22 is closed (reference S53). In Step 225, a scanner drive signal for operating the scan drive motor 55 in the rearward direction is output (reference S54), lowering the moving member 52 (reference S55).

During the descent of the moving member 52, when it is confirmed in Step 226 that the line sensor 44 has returned to the initial position of the scanning mechanism 50, the output of the scanner drive signal is stopped in Step 227 (reference S56), so that the scan drive motor 55 is stopped (reference S57). Then, in Step 228, the execution of all interruption handling programs is prohibited, and ends. The sensing operation of the initial position executed in Step 226 is performed based on a signal which is output when a part of the moving member 52 transverses a photo-interrupter (not shown).

FIGS. 9A and 9B are flow charts of the enforced recording operation, which is a program for performing a recording operation during a reading operation of an image recorded in the electro-developing recording medium 30. This program is executed when the recording operation mode is set by operating the main switch 10 during the scanning operation (i.e., the reading operation).

In Step 301, it is determined whether the reading operation in which the line sensor 44 reads pixel signals of one horizontal scanning line has been completed. When the reading operation of one horizontal scanning line has been completed, the shutter 22 is closed in Step 302, and the light source 42 is turned OFF in Step 303. In Step 304, the scanning mechanism 50 is withdrawn to a position at which the scanning mechanism 50 does not interfere with the optical path of the photographing optical system 12. In Step 305, the electro-developing recording medium 30 mounted in the camera body 11 is ejected therefrom by a motor (not shown).

When it is confirmed in Step 307 that a new (or next) electro-developing recording medium has been set (or mounted) in the camera body 11, it is determined in Step 308 whether the newly inserted electro-developing recording medium has been recorded or not. This determination is carried out based on the transparency of the liquid crystal display of the electro-developing recording medium as described with reference to FIG. 4. If the new electro-developing recording medium set in the camera body 11 has been recorded, the process returns to Step 305, since the recording operation cannot be carried out. Conversely, if the new electro-developing recording medium set in the camera body 11 has not been recorded, the process goes to Step 309 so that a recording operation can be carried out.

When it is detected in Step 309 that the release switch 14 is turned ON, the normal recording operation shown in FIG. 7 is performed in Step 310. In Step 311, the electro-developing recording medium set in the camera body 11 is ejected therefrom.

When it is sensed in Step 312 that a new electro-developing recording medium is set in the slot 18 of the camera body 11, it is determined in Step 313 whether the new electro-developing recording medium has been recorded or not. When a non-recorded electro-developing recording medium has been set, the process goes to Step 309. Conversely, when a recorded electro-developing recording medium has been set, Step 316 is executed. When it is confirmed in Step 316 that the second scanning switch 16b is turned ON, the light source 42 is turned ON in Step 318, and the shutter 22 is opened in Step 319. In Step 320, a line sensor drive power source, included in the line sensor drive circuit 47, is turned ON. In Step 321, the scanning mechanism 50, i.e., the line sensor 44, is moved to a break point, which is a point of the horizontal scanning line and which has been stored in the memory 20a of the system control circuit 20 in Step 220 shown in FIG. 8B. The process then goes to Step 210 shown in Fig. to end the enforced recording operation.

The electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-321114, (filed on Nov. 15, 1995) which is expressly incorporated herein, by reference, in its entirety.

I claim:

1. A device for controlling an operation of an electro-developing type camera using an electro-developing recording medium by which an image is electronically developed, said control device comprising:

a switch, said switch being manually settable to at least one of a scanning position and a recording position;

an image recording processor that records an image in said electro-developing recording medium in accordance with a photographing operation of said electro-developing type camera when said switch is in the recording position;

an image reading processor that reads said image from said electro-developing recording medium when said switch is in the scanning position; and an operation mode setting processor actuating said image recording processor and said image reading processor, said operation mode setting processor stopping the reading operation of said image reading processor and actuating said image recording processor when a position of said switch is changed while said image reading processor is being operated.

2. A control device according to claim 1, wherein said image reading processor comprises an optical sensor moving along said electro-developing recording medium to read said image recorded in said electro-developing recording medium.

3. A control device according to claim 2, wherein said optical sensor is a line sensor reading said image line by line.

4. A control device according to claim 2, further comprising a reading position storing processor storing a position of a part of said image which has been read by said optical sensor.

5. A control device according to claim 4, wherein, after said image recording processor is actuated while said image reading processor is being operated, and completes a recording operation in which an image is recorded in said electro-developing recording medium, said operation mode setting processor sets said optical sensor at said stored position.

6. A control device according to claim 2, wherein said image reading processor completes a reading of an image signal corresponding to a part of said image which said optical sensor faces, when said operation mode setting processor actuates said image recording processor while said image reading processor is being operated.

7. A control device according to claim 1, further comprising a determining processor determining whether an electro-developing recording medium mounted in said electro-developing type camera has been recorded or not, after said operation mode setting processor actuates said image recording processor while said image reading processor is being operated.

8. A control device according to claim 7, wherein said image recording processor records an image in an electro-developing recording medium, when said determining processor determines that said electro-developing recording medium has not been recorded.

9. A control device according to claim 1, wherein said electro-developing recording medium comprises an electrostatic information recording medium generating an electric charge in accordance with an image formed thereon, and an electric charge storage medium which generates a visible image in accordance with said electric charge and which can retain said visible image.

10. A control device according to claim 9, wherein said electric charge storage medium is a liquid crystal display having a memory-type liquid crystal.

11. A control device according to claim 1, further comprising an ejecting device for ejecting the recording medium.

12. A device for controlling an operation of an electro-developing type camera using an electro-developing recording medium by which an image is electronically developed, said control device comprising:

means for switching, said switching means being manually adjustable to at least one of a scanning position and a recording position;

means for recording an image in said electro-developing recording medium in accordance with a photographing operation of said electro-developing type camera when said switching means is in the scanning position;

means for reading said image from said electro-developing recording medium when said switching means is in the scanning position; and means for actuating said image recording processor and said image reading processor, said actuating means stopping the reading operation of said reading means and actuating said recording means when a position of said switch means is changed while said reading means is being operated.

13. A control device according to claim 12, further comprising means for ejecting the recording medium.

14. A device for controlling an operation of an electro-developing type camera using an electro-developing recording medium by which an image is electronically developed, said control device comprising:

a switch, said switch being manually settable to at least one of a scanning position and a recording position;

an image recording processor that carries out a recording operation in which an image is recorded in said electro-developing recording medium in accordance with a photographing operation of said electro-developing type camera when said switch is in the recording position; and an image reading processor that carries out a reading operation in which said image is read when said switch is in the scanning position;

said image recording processor carrying out said recording operation after a position of said switch is changed during a reading operation of a one frame image that has not been completed.

15. A control device according to claim 14, further comprising an ejecting device for ejecting the recording medium.

* * * * *